United States Patent
Iwashita et al.

(10) Patent No.: US 7,631,528 B2
(45) Date of Patent: Dec. 15, 2009

(54) DIE CUSHION MECHANISM, AND APPARATUS AND METHOD FOR CONTROLLING THE SAME

(75) Inventors: Yasusuke Iwashita, Fujiyoshida (JP); Tadashi Okita, Fujiyoshida (JP); Hiroyuki Kawamura, Yamanashi (JP); Satoshi Ikai, Yamanashi (JP)

(73) Assignees: Fanuc Ltd, Yamanashi (JP); Komatsu Ltd, Minato-ku, Tokyo (JP); Komatsu Industries Corporation, Komatsu-shi, Ishikawa (JP)

( * ) Notice: Subject to any disclaimer, the term of this patent is extended or adjusted under 35 U.S.C. 154(b) by 708 days.

(21) Appl. No.: 11/265,187

(22) Filed: Nov. 3, 2005

(65) Prior Publication Data

US 2006/0090534 A1    May 4, 2006

(30) Foreign Application Priority Data

Nov. 4, 2004    (JP)    .............................. 2004-321203

(51) Int. Cl.
*B21D 55/00*    (2006.01)
*B21C 51/00*    (2006.01)
*B21J 9/18*    (2006.01)

(52) U.S. Cl. ........................... 72/20.1; 72/454; 72/21.4

(58) Field of Classification Search ................... 72/350, 72/351, 454, 1, 3, 31.01, 21.4, 20.1
See application file for complete search history.

(56) References Cited

U.S. PATENT DOCUMENTS

| 5,435,166 A | * | 7/1995 | Sunada ........................ 72/351 |
| 5,701,811 A | | 12/1997 | Kawakami |
| 2003/0066323 A1 | * | 4/2003 | Teraoka ........................... 72/1 |

FOREIGN PATENT DOCUMENTS

| EP | 0 569 603 A1 | 11/1992 |
| JP | 3-81099 | 4/1991 |
| JP | 4-55100 | 2/1992 |
| JP | 8-300058 | 11/1996 |

(Continued)

OTHER PUBLICATIONS

European Search Report mailed Apr. 7, 2008 issued in EP Application No. 05023983.9.

(Continued)

*Primary Examiner*—Dana Ross
*Assistant Examiner*—Debra M Sullivan
(74) *Attorney, Agent, or Firm*—Drinker Biddle & Reath LLP (57) ABSTRACT

A control apparatus for controlling a die cushion mechanism including a servo-motor as a drive source and producing a force adapted to be applied outside. The control apparatus includes a force commanding section for commanding a force to be produced by the die cushion mechanism; a force detecting section for detecting a force produced by the die cushion mechanism; a force controlling section for executing a force control on the servo-motor, based on a force command value commanded by the force commanding section and a force detected value detected by the force detecting section; and an abnormality preventing section for preventing, in association with a control state of the servo-motor, the die cushion mechanism from producing an abnormal force.

15 Claims, 5 Drawing Sheets

FOREIGN PATENT DOCUMENTS

| | | |
|---|---|---|
| JP | 10-202327 | 8/1998 |
| JP | 2000-035845 | 2/2000 |
| JP | 2004-017122 | 1/2004 |
| JP | 2004-174558 | 6/2004 |

OTHER PUBLICATIONS

Japanese Notice of Reasons for Rejection dated Apr. 1, 2008 issued in JP Application No. 2004-321203 (including a partial translation thereof).

* cited by examiner

DIE CUSHION MECHANISM, AND APPARATUS AND METHOD FOR CONTROLLING THE SAME

BACKGROUND OF THE INVENTION

1. Field of the Invention

The present invention relates to a die cushion mechanism, and also to an apparatus and a method for controlling the die cushion mechanism.

2. Description of the Related Art

In a press machine for performing press working, such as bending, drawing, stamping, etc., it is known that a die cushion mechanism is provided as an auxiliary apparatus for applying, during a pressing operation, a required force (or pressure) to a movable support member (generally referred to as a slide) supporting a first die used for the press working, from the side of a second support member (generally referred to as a bolster) supporting a second die. The die cushion mechanism is usually constructed such that a movable element (generally referred to as a cushion pad) retained under a predetermined pressure is arranged to collide directly or indirectly with the slide (or the first die) moving in a die-closing direction and, after the collision, the cushion pad moves together with the slide while exerting a force (or pressure) to the slide, through the step of die-closing (or press forming) to the step of die-opening. During this procedure, it is possible, for example, to prevent a material to be pressed (or a workpiece) from being wrinkled by holding the peripheral region of the workpiece surrounding a pressed area between the cushion pad and the slide.

In order to improve the accuracy of the press working using the die cushion mechanism, it is required that the cushion pad stably applies a commanded force (or pressure) to the slide during a period when the cushion pad is moving together with the slide. However, as a conventional die cushion mechanism uses a hydraulic or pneumatic device as the drive source, it has generally been difficult to control the force (or pressure) applied to the slide so as to correspond to a command value in a variable mode, in response to a sudden pressure variation due to external causes, such as the collision with the slide, etc. Therefore, a die cushion mechanism including a servo-motor as a drive source has been recently developed, so as to achieve the force control possessing an excellent performance in response.

For example, Japanese Unexamined Patent Publication (Kokai) No. 10-202327 (JP-A-10-202327) discloses a die cushion mechanism in which a cushion pad arranged beneath a slide of a press machine is vertically moved up and down by a servo-motor so as to correspond to the vertical motion of the slide. During a period when the slide is moved downward (i.e., during the pressing operation), and before the slide applies a collision force to the cushion pad, the servo-motor acts in accordance with a position control based on a position command for the cushion pad, so as to locate the cushion pad at a predetermined waiting position. Also, after the slide applies a collision force to the cushion pad, the servo-motor acts in accordance with a force control based on a force command previously determined to correspond to the position of the cushion pad, so as to move the cushion pad together with the slide and simultaneously adjust the force (or pressure) applied to the slide from the cushion pad. In this connection, the detection of collision and pressure is accomplished by detecting a load applied to the output shaft of the servo-motor through the cushion pad.

As described above, in the conventional die cushion mechanism using a servo-motor drive, the force (or pressure) applied to the slide from the cushion pad is suitably adjusted by changing the control scheme of the servo-motor from the position control to the force control at an instant when the slide exerts a collision force to the cushion pad. However, in the conventional die cushion mechanism, it may be difficult to execute a proper and safe force control because, when abnormality occurs in the actually produced force (or pressure) due to, e.g., a malfunction in a force detecting section for detecting the force (or pressure) of the cushion pad or an error in inputting a force command value by an operator, the abnormality cannot be detected immediately. Also, it may be difficult to execute a proper and safe position control because, when it becomes inappropriate to continue the position control due to, e.g., a delay in changing from the position control to the force control or a malfunction in the movable section of the die cushion mechanism, the inappropriate state cannot be detected immediately.

SUMMARY OF THE INVENTION

It is an object of the present invention to provide a control apparatus for a die cushion mechanism including a servo-motor as a drive source and producing a force adapted to be applied outside, which is capable of immediately detecting the occurrence of an abnormality in the actually produced force or of a condition inappropriate to continue the position control, and thus can execute a proper and safe control.

It is another object of the present invention to provide a die cushion mechanism, adapted to be incorporated in a press machine, which is capable of immediately detecting an abnormality in operation and thus offers high safety.

It is still another object of the present invention to provide a control method for a die cushion mechanism including a servo-motor as a drive source and producing a force adapted to be applied outside, which is capable of immediately detecting the occurrence of an abnormality in the actually produced force or of a condition inappropriate to continue the position control, and thus can execute a proper and safe control.

To accomplish the above objects, the present invention provides a control apparatus for controlling a die cushion mechanism including a servo-motor as a drive source and producing a force adapted to be applied outside, comprising a force commanding section for commanding a force to be produced by the die cushion mechanism; a force detecting section for detecting a force produced by the die cushion mechanism; a force controlling section for executing a force control on the servo-motor, based on a force command value commanded by the force commanding section and a force detected value detected by the force detecting section; and an abnormality preventing section for preventing, in association with a control state of the servo-motor, the die cushion mechanism from producing an abnormal force.

In the above control apparatus, the abnormality preventing section may include an abnormality judging section for judging whether an abnormality is present in the force detected value detected by the force detecting section, by comparing the force detected value with a predetermined threshold value of the force.

In this arrangement, the abnormality judging section may judge a presence of the abnormality, when the force detected value becomes smaller or larger than the threshold value. Also, the abnormality judging section judges whether the abnormality is present, during a period when the force controlling section executes the force control.

The abnormality preventing section may further include an alarm section for detecting, when the abnormality judging section judges a presence of the abnormality, an abnormality in the force produced by the die cushion mechanism and outputting an alarm.

The above control apparatus may further include a position commanding section for commanding a desired position of the servo-motor, a position detecting section for detecting an existing position of the servo-motor, a position controlling section for executing a position control for the servo-motor based on a position command value commanded by the position commanding section and a position detected value detected by the position detecting section, and a control changing section for selecting either one of the force controlling section and the position controlling section to make a selected section execute a control of the servo-motor. In this configuration, the abnormality preventing section includes a current limiting section for setting the upper limit of an electric current used for the position control by the position controlling section to be smaller than the allowable maximum current for operating the servo-motor.

The present invention also describes a die cushion mechanism incorporated into a press machine, comprising a cushion pad movable correspondingly to a motion of a slide; a servo-motor for driving the cushion pad; and a control apparatus for controlling the servo-motor and producing an correlative pressure between the cushion pad and the slide; wherein the control apparatus comprises a control apparatus as described above.

The present invention further describes a control method for controlling a die cushion mechanism including a servo-motor as a drive source and producing a force adapted to be applied outside, comprising determining a force command value regarding a force to be produced by the die cushion mechanism; determining a force detected value regarding a force actually produced by the die cushion mechanism; executing a force control on the servo-motor, based on the force command value and the force detected value; and preventing, in association with a control state of the servo-motor, the die cushion mechanism from producing an abnormal force.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

The embodiments of the present invention are described below in detail, with reference to the accompanying drawings. In the drawings, the same or similar components are denoted by common reference numerals.

Figure 1:
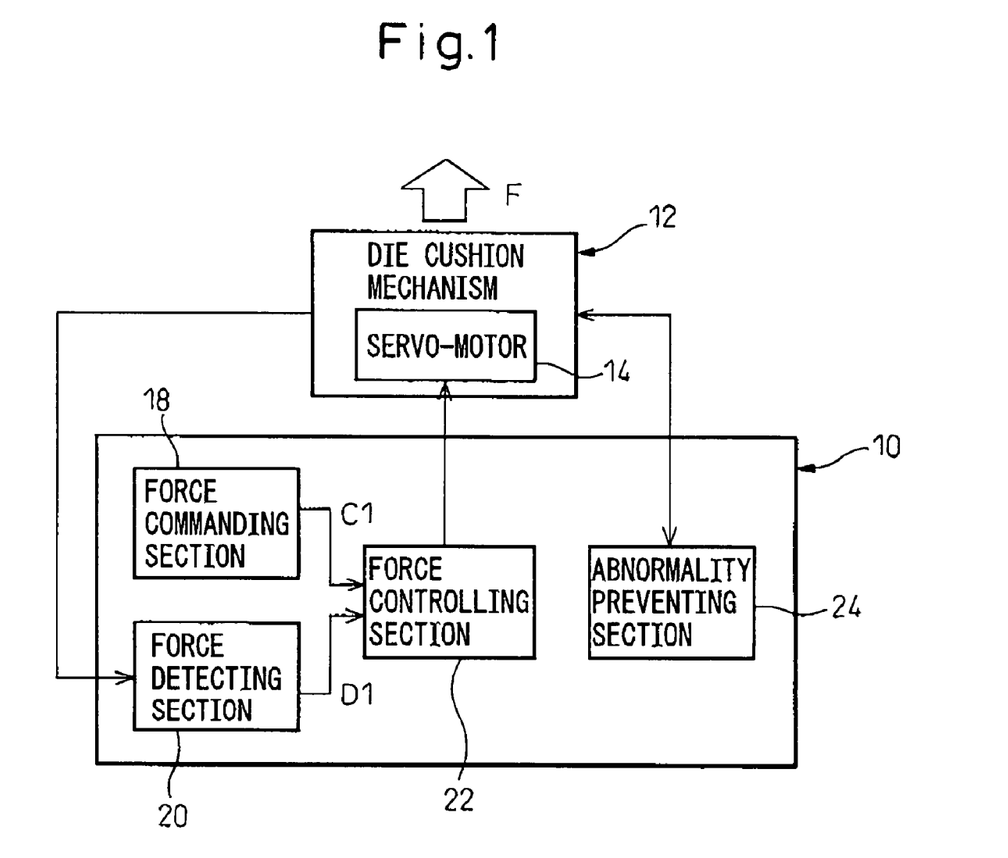
FIG. 1 is a functional block diagram showing a basic configuration of a control apparatus for a die cushion mechanism, according to the present invention.
Figure 2:
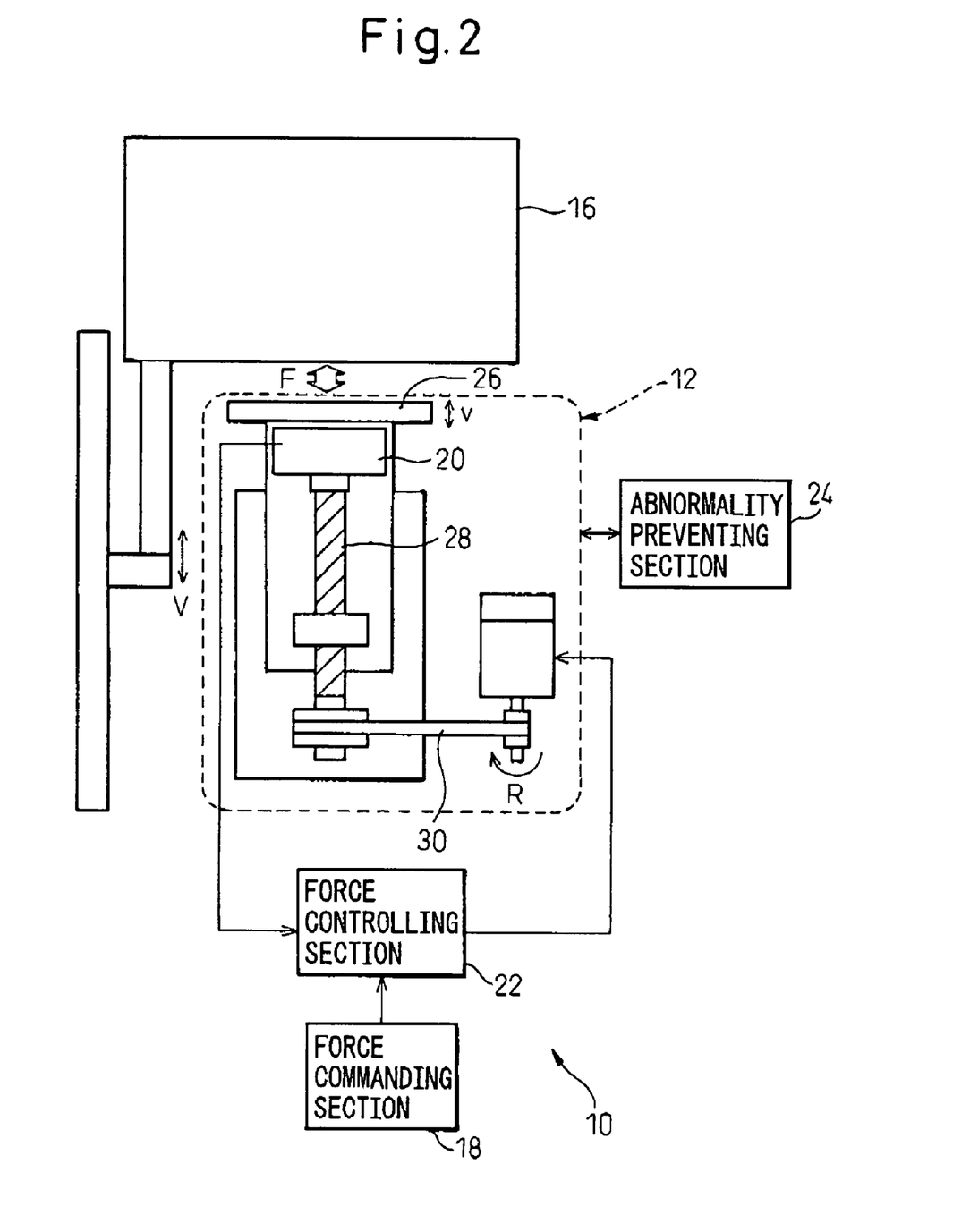
FIG. 2 is an illustration schematically showing a die cushion mechanism according to an embodiment of the present invention, which includes the control apparatus of FIG. 1.

Referring to the drawings, FIG. 1 is a functional block diagram showing the basic construction of a control apparatus 10 according to the present invention, and FIG. 2 is a typical illustration showing the basic construction of a die cushion mechanism 12 according to an embodiment of the present invention including the control apparatus 10.

As shown in FIGS. 1 and 2, the control apparatus 10 according to the present invention has a configuration for controlling a die cushion mechanism 12 including a servo-motor 14 as a drive source and producing a force F adapted to be applied outside (e.g., a force F against a slide 16 in a press machine), and includes a force commanding section 18 for commanding a force F to be produced by the die cushion mechanism 12; a force detecting section 20 for detecting a force F produced by the die cushion mechanism 12; a force controlling section 22 for executing a force control on the servo-motor 14, on the basis of a force command value C1 commanded by the force commanding section 18 and a force detected value D1 detected by the force detecting section 20; and an abnormality preventing section 24 for preventing, in association with a control state of the servo-motor 14 defining the operation of the die cushion mechanism 12, the die cushion mechanism 12 from producing an abnormal force F.

The die cushion mechanism 12, according to an embodiment of the present invention, is an auxiliary apparatus incorporated into a press machine and includes a cushion pad 26 moving in correspondence with the motion of the slide 16, a servo-motor 14 driving the cushion pad 26, and the control apparatus 10 controlling the servo-motor 14 to make it produce a correlative pressure (i.e., the force F) between the cushion pad 26 and the slide 16. The slide 16 supports a first die (not shown) used for a press working, and moves at a speed V required for a press working in a direction toward or away from a second die (not shown) supported on a not-shown bolster. The cushion pad 28 is arranged in association with the second die, and is connected through a ball screw unit 28 and a belt/pulley unit 30 to an output shaft of the servo-motor 14. The slide 16 (or the first die) collides directly or indirectly against the cushion pad 26 waiting at a predetermined position, during a period when the slide moves in a die-closing direction. Usually, through the step of die-closing (or press forming) to the step of die-opening, the cushion pad 26 moves together with the slide 16 while applying the required force (or pressure) F to the slide 16. In this connection, the force detecting section 20 may include a known force sensor. Also, a speed feedback value used for controlling the servo-motor 14 may be detected by a known encoder (not shown).

The control apparatus 10 having the above-described configuration is capable of immediately detecting the occurrence of an abnormality in the actually produced force F due to, e.g., a malfunction in the force detecting section 20 or an error in inputting the force command value C1, and thus can execute a proper and safe force control, because of the provision of the abnormality preventing section 24 functioning in association with the control state of the servo-motor 14. Further, it is possible to immediately detect the occurrence of a condition inappropriate to continue the position control due to, e.g., a delay in changing from the position control to the force control for the servo-motor 14 or a malfunction in the movable section of the die cushion mechanism 12, and thus can execute a proper and safe position control. Consequently, the die cushion mechanism 12 incorporated into the press machine is capable of immediately detect an abnormality in operation and thus possesses a high safety.

The above-described configuration of the control apparatus 10 may also be described as a control method as follows: a method for controlling a die cushion mechanism 12 including a servo-motor 14 as a drive source and producing a force F adapted to be applied outside, the method including the steps of determining a force command value C1 regarding a force F to be produced by the die cushion mechanism 12; determining a force detected value D1 regarding a force F actually produced by the die cushion mechanism 12; executing a force control on the servo-motor 14 on the basis of the force command value C1 and the force detected value D1; and preventing, in association with a control state of the servo-motor 14, the die cushion mechanism 12 from producing an abnormal force F. The above-described particular operative effect can be obtained by executing this control method.

More concrete configurations of the abnormality preventing section 24 in the control apparatus 10 will be described below in connection with some preferred embodiments of the present invention. Each of these embodiments has the basic construction of the control apparatus 10 as described above, so that corresponding components are denoted by common reference numerals or symbols and the explanation thereof is not repeated.

Figure 3:
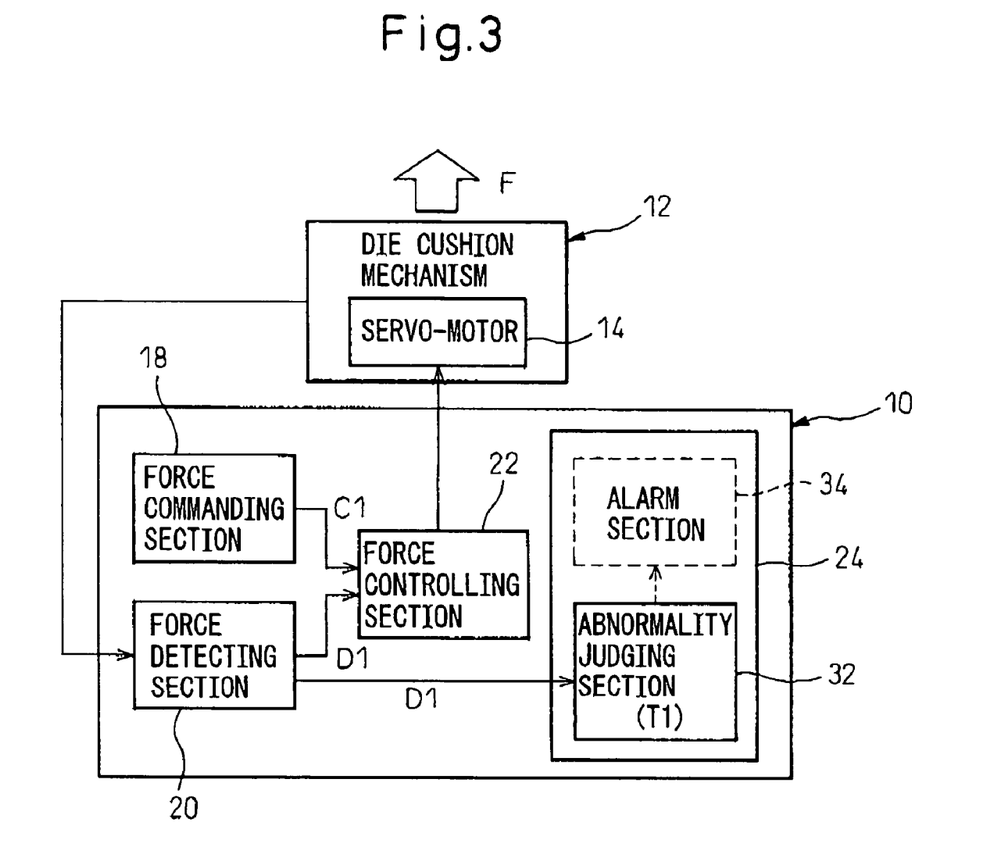
FIG. 3 is a functional block diagram showing a control apparatus according to a first embodiment of the present invention.

In a control apparatus 10 according to a first embodiment shown in FIG. 3, the abnormality preventing section 24 includes an abnormality judging section 32 for judging whether an abnormality is present in the force detected value D1 detected by the force detecting section 20, by comparing the force detected value D1 with a predetermined threshold value T1 of force. Thereby, at an instant when an abnormality occurs in the force F actually produced by the die cushion mechanism 12, it is possible to immediately detect the abnormality and quickly take a countermeasure. For example, if the abnormality preventing section 24 is further provided with an alarm section 34 for outputting an alarm when the abnormality judging section 32 judges a presence of the abnormality in the force detected value D1, it is possible to immediately inform an operator about the abnormality in the force F produced by the die cushion mechanism 12. Such a force monitoring operation by the abnormality judging section 32 can be performed at predetermined intervals in the press working operation. In this connection, when the abnormality judging section 32 judges that there is no abnormality in the force detected value D1, the force detected value D1 may be used as it is to execute the force control of the servo-motor 14 by the force controlling section 22.

In the above configuration, the abnormality judging section 32 may be configured to judge a presence of the abnormality, when the force detected value D1 becomes smaller than the threshold value T1. In this configuration, when, e.g., a malfunction occurs in a force detecting system including the force detecting section 20, it is possible to quickly perform a repair work or take other countermeasures. Alternatively, the abnormality judging section 32 may be configured to judge a presence of the abnormality, when the force detected value D1 becomes larger than the threshold value T1. In this configuration, not only when the detecting system falls into malfunction, but also when an excessively large force command value C1 is erroneously input by an operator, it is possible to immediately detect this error and quickly take an emergency shutdown or other countermeasures. In either configuration, it is possible to prevent the die cushion mechanism 12 or other components of the press machine from being damaged by neglecting the abnormality in the force detected value D1.

In the above configuration, it is advantageous that the abnormality judging section 32 judges whether the abnormality is present in the force detected value D1, during a period when the force controlling section 22 executes the force control. As already described, the force control is generally used for a motion control of the cushion pad 26 (FIG. 2) during a period when the slide 16 (FIG. 2) and the cushion pad 26 move synchronously with each other after the collision therebetween. Therefore, by immediately detecting the abnormality in the force detected value D1 during the force control, it is possible to ensure the effectiveness of the abnormality preventing function of the control apparatus 10.

Figure 4:
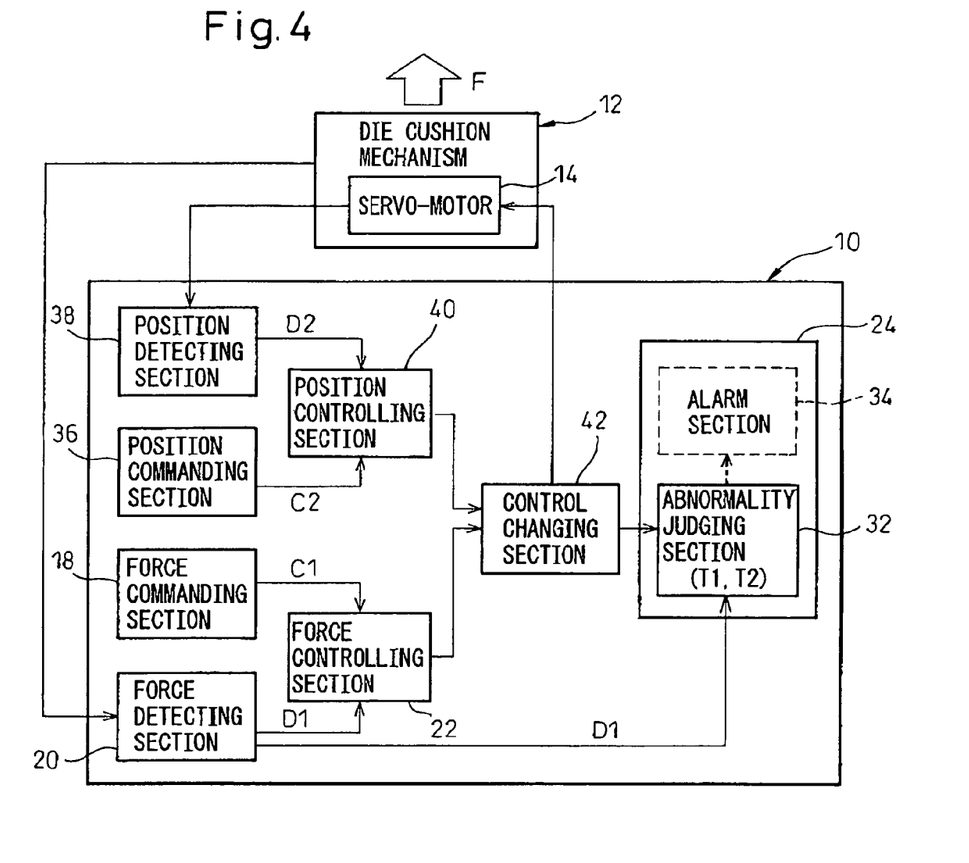
FIG. 4 is a functional block diagram showing a control apparatus according to a second embodiment of the present invention.

A control apparatus 10 according to a second embodiment shown in FIG. 4 further includes a position commanding section 36 for commanding a desired position (in an operation) of the servo-motor 14, a position detecting section 38 for detecting an existing position (in an operation) of the servo-motor 14, a position controlling section 40 for executing a position control for the servo-motor 14 on the basis of a position command value C2 commanded by the position commanding section 36 and a position detected value D2 detected by the position detecting section 38, and a control changing section 42 for selecting either one of the force controlling section 22 and the position controlling section 40 to make the selected section execute a control of the servo-motor 14. The abnormality preventing section 24 includes the above-described abnormality judging section 32 and the above-described alarm section 34, if necessary. The abnormality judging section 32 is configured to judge whether the abnormality is present in the force detected value D1 by comparing the force detected value D1 detected by the force detecting section 20 with a predetermined threshold force value T2, during a period when the position controlling section 40 selected by the control changing section 42 executes the position control. In this case, the abnormality judging section 32 judges a presence of the abnormality, when the force detected value D1 becomes larger than the threshold value T2.

According to this configuration, even if it becomes inappropriate to continue the position control due to, e.g., a delay in changing from the position control to the force control for the servo-motor 14 or a malfunction in the movable section of the die cushion mechanism 12, it is possible to immediately detect the abnormality in the force F produced by the die cushion mechanism 12 and quickly take countermeasures, during the execution of such undesirable position control. For example, the alarm section 34 may output an alarm, so as to take an emergency shutdown or other countermeasures. The control changing section 42 may be configured to immediately select the force controlling section 22 to forcibly change the position control to the force control, during the execution of the position control, at an instant when the abnormality judging section 32 judges a presence of the abnormality in the force detected value D1. Thereby, it is possible to prevent an excessive force F from being produced in the die cushion mechanism 12. Such a force monitoring operation by the abnormality judging section 32 can be performed at predetermined intervals in the press working operation. In this connection, when the abnormality judging section 32 judges that there is no abnormality in the force detected value D1, the position control may be continuously performed as it is.

In the above configuration, it is advantageous, in view of ensuring the effectiveness of the abnormality preventing function, that the abnormality judging section 32 judges whether the abnormality is present, during a period when the force controlling section 22 selected by the control changing section 42 executes the force control. In this case, although the threshold value T2 with which the force detected value D1 is compared during the execution of the position control may be identical to the threshold value T1 with which the force detected value D1 is compared during the execution of the force control, if these threshold values are set differently from each other, it is possible to adjust a safety during the position control at a desired level. In particular, if the threshold value T2 with which the force detected value D1 is compared during the execution of the position control is set smaller than the threshold value T1 with which the force detected value D1 is compared during the execution of the force control, it is possible to take countermeasures as quickly as possible, even when the above-described undesirable position control is executed.

Figure 5:
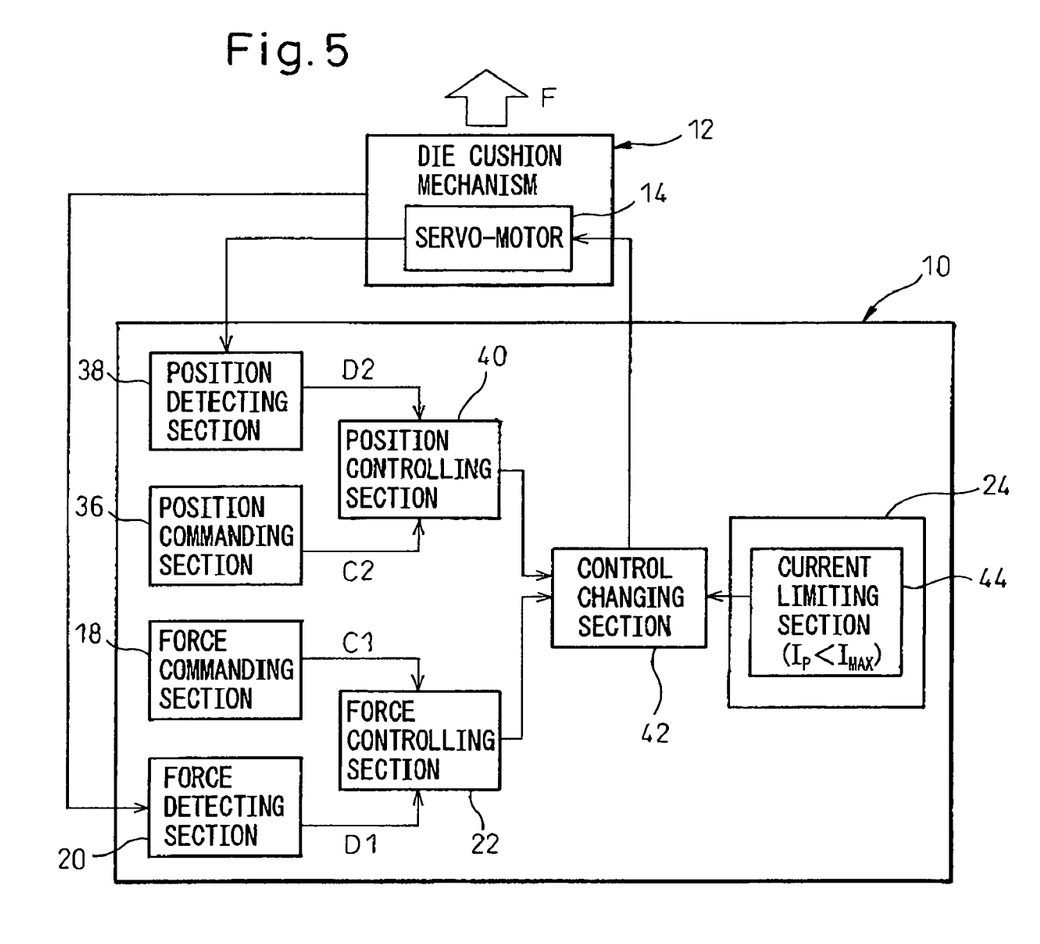
FIG. 5 is a functional block diagram showing a control apparatus according to a third embodiment of the present invention.

A control apparatus 10 according to a third embodiment shown in FIG. 5 further includes a position commanding section 36 for commanding a desired position (in an operation) of the servo-motor 14, a position detecting section 38 for detecting an existing position (in an operation) of the servo-motor 14, a position controlling section 40 for executing a position control for the servo-motor 14 on the basis of a position command value C2 commanded by the position commanding section 36 and a position detected value D2 detected by the position detecting section 38, and a control changing section 42 for selecting either one of the force controlling section 22 and the position controlling section 40 to make the selected section execute a control of the servo-motor 14. The abnormality preventing section 24 includes a current limiting section 44 for setting the upper limit of an electric current $I_p$ used for the position control by the position controlling section 40 to be smaller than the allowable maximum current $I_{MAX}$ of an amplifier (not shown) used for operating the servo-motor 14.

According to this configuration, during a period when the control changing section 42 selects the position controlling section 40 to execute the position control, a limit is provided in a final torque command on the servo-motor 14 such that the current $I_p$ smaller than the maximum current $I_{MAX}$ allowed in the amplifier is to be commanded, so that it is possible to limit the force F produced by the die cushion mechanism 12 at a small level. Therefore, even when the above-described undesirable position control is executed, it is possible to significantly reduce influences such as damages on the die cushion mechanism 12 or the other components of the press machine.

In the above configuration, it is advantageous that the current limiting section 44 sets the upper limit of the electric current $I_p$ used for the position control to be smaller than the allowable maximum current $I_{MAX}$, in association only with an operating direction of the servo-motor 14 for making the die cushion mechanism 12 produce the force F. Thereby, it is possible to improve the effectiveness of the abnormality preventing function in the control apparatus 10.

Although the configuration of each of the above-described first to third embodiments ensures a particular operative effect by itself, it is to be understood that two or more of the embodiments can be combined for use, which ensures a more remarkable operative effect.

While the invention has been described with reference to specific preferred embodiments, it will be understood by those skilled in the art that various changes and modifications may be made thereto without departing from the scope of the following claims.

The invention claimed is:

1. A control apparatus for controlling a die cushion mechanism including a servo-motor as a drive source and producing a force adapted to be applied outside, comprising:
a force commanding section for commanding a force to be produced by said die cushion mechanism;
a force detecting section for detecting a force produced by said die cushion mechanism;
a force controlling section for executing a force control on said servo-motor, based on a force command value commanded by said force commanding section and a force detected value detected by said force detecting section;
a position commanding section for commanding a desired position of said servo-motor;
a position detecting section for detecting an existing position of said servo-motor;
a position controlling section for executing a position control for said servo-motor based on a position command value commanded by said position commanding section and a position detected value detected by said position detecting section;
a control changing section for selecting either one of said force controlling section and said position controlling section to make a selected section execute a control of said servo-motor; and
an abnormality preventing section for preventing, in association with a control state of said servo-motor, said die cushion mechanism from producing an abnormal force;
wherein said abnormality preventing section includes an abnormality judging section for judging whether an abnormality is present in said force detected value detected by said force detecting section, by comparing said force detected value with a predetermined threshold value of force, during a period when said position controlling section selected by said control changing section executes said position control;
wherein said abnormality judging section judges a presence of said abnormality when said force detected value becomes larger than said threshold value.

2. A control apparatus as set forth in claim 1, wherein said control changing section selects said force controlling section, to change said position control to said force control, when said abnormality judging section judges a presence of said abnormality.

3. A control apparatus as set forth in claim 1, wherein said abnormality judging section judges whether said abnormality is present, during a period when said force controlling section selected by said control changing section executes said force control.

4. A control apparatus as set forth in claim 3, wherein said threshold value to which said force detected value is compared during an execution of said position control is set differently from said threshold value to which said force detected value is compared during an execution of said force control.

5. A control apparatus as set forth in claim 1, wherein said abnormality preventing section further includes an alarm section for detecting, when said abnormality judging section judges a presence of said abnormality, an abnormality in said force produced by said die cushion mechanism and outputting an alarm.

6. A control apparatus as set forth in claim 1, wherein said abnormality preventing section includes a current limiting section for setting an upper limit of an electric current used for said position control by said position controlling section to be smaller than an allowable maximum current for operating said servo-motor.

7. A control apparatus as set forth in claim 6, wherein said current limiting section sets said upper limit of said electric current used for said position control to be smaller than said allowable maximum current, in association only with an operating direction of said servo-motor for making said die cushion mechanism produce said force.

8. A die cushion mechanism incorporated into a press machine, comprising:
   a cushion pad movable correspondingly to a motion of a slide;
   a servo-motor for driving said cushion pad; and
   a control apparatus for controlling said servo-motor and producing an correlative pressure between said cushion pad and said slide; wherein said control apparatus comprises a control apparatus as described in claim 1.

9. A control method for controlling a die cushion mechanism including a servo-motor as a drive source and producing a force adapted to be applied outside, comprising:
   determining a force command value regarding a force to be produced by said die cushion mechanism;
   determining a force detected value regarding a force actually produced by said die cushion mechanism;
   executing a force control on said servo-motor, based on said force command value and said force detected value;
   determining a desired position of said servo-motor;
   determining an existing position of said servo-motor;
   selectively executing either one of said force control and a position control for said servo-motor based on said desired position and said existing position; and
   preventing, in association with a control state of said servo-motor, said die cushion mechanism from producing an abnormal force;
   wherein the step of preventing said abnormal force from being produced includes an abnormality judging step for judging whether an abnormality is present in said force detected value, by comparing said force detected value with a predetermined threshold value of force, said abnormality judging step being performed during a period when said position control is executed;
   wherein a presence of said abnormality is judged in said abnormality judging step when said force detected value becomes larger than said threshold value.

10. A control method as set forth in claim 9, wherein when a presence of said abnormality is judged in said abnormality judging step, said position control is changed to said force control.

11. A control method as set forth in claim 9, wherein said judging whether said abnormality is present, in said abnormality judging step, is performed during a period when said force control is executed.

12. A control method as set forth in claim 11, wherein said threshold value to which said force detected value is compared during an execution of said position control is set differently from said threshold value to which said force detected value is compared during an execution of said force control.

13. A control method as set forth in claim 9, wherein the step of preventing said abnormal force from being produced further includes detecting, when judging a presence of said abnormality, an abnormality in said force produced by said die cushion mechanism and outputting an alarm.

14. A control method as set forth in claim 9, wherein the step of preventing said abnormal force from being produced includes an upper-limit setting step for setting an upper limit of an electric current used for said position control to be smaller than an allowable maximum current for operating said servo-motor.

15. A control method as set forth in claim 14, wherein the upper-limit setting step sets said upper limit of said electric current used for said position control is set to be smaller than said allowable maximum current, in association only with an operating direction of said servo-motor for making said die cushion mechanism produce said force.

* * * * *